(12) United States Patent
Nunoya et al.

(10) Patent No.: US 12,032,400 B2
(45) Date of Patent: Jul. 9, 2024

(54) NON-CONTACT POWER SUPPLY FACILITY, IMPEDANCE ADJUSTMENT METHOD FOR NON-CONTACT POWER SUPPLY FACILITY, AND IMPEDANCE ADJUSTMENT PROGRAM FOR NON-CONTACT POWER SUPPLY FACILITY

(71) Applicant: Daifuku Co., Ltd., Osaka (JP)

(72) Inventors: Makoto Nunoya, Hinocho (JP); Masaaki Yamamoto, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 17/980,935

(22) Filed: Nov. 4, 2022

(65) Prior Publication Data

US 2023/0146550 A1 May 11, 2023

(30) Foreign Application Priority Data

Nov. 5, 2021 (JP) ................. 2021-181420

(51) Int. Cl.
| | | |
|---|---|---|
| *G05F 1/625* | (2006.01) | |
| *B60L 53/12* | (2019.01) | |
| *B60L 53/62* | (2019.01) | |
| *H02J 50/10* | (2016.01) | |
| *H02J 50/40* | (2016.01) | |
| *H02J 50/90* | (2016.01) | |

(52) U.S. Cl.
CPC ............. *G05F 1/625* (2013.01); *B60L 53/12* (2019.02); *B60L 53/62* (2019.02); *H02J 50/10* (2016.02); *H02J 50/40* (2016.02); *H02J 50/90* (2016.02)

(58) Field of Classification Search
CPC .......... G05F 1/625; B60L 53/12; B60L 53/62; H02J 50/10; H02J 50/40; H02J 50/90
See application file for complete search history.

(56) References Cited

U.S. PATENT DOCUMENTS

| | | | |
|---|---|---|---|
| 8,907,527 B2 * | 12/2014 | Nishino | H02J 50/12 |
| | | | 307/104 |
| 10,483,807 B2 * | 11/2019 | Matsuno | H02J 50/80 |

(Continued)

FOREIGN PATENT DOCUMENTS

JP        11155245 A      6/1999

*Primary Examiner* — Daniel Kessie
*Assistant Examiner* — Brian K Baxter
(74) *Attorney, Agent, or Firm* — The Webb Law Firm (57) ABSTRACT

An adjustment system causes a target power supply device to execute first processing and second processing while causing at least one adjacent power supply device to perform a regular power supply operation. The first processing is processing for measuring a first voltage value while a power supply circuit of the target power supply device does not output an alternating current. The second processing is processing for measuring a second voltage value while the power supply circuit of the target power supply device outputs an alternating current. The adjustment system obtains a feeder circuit reactance of a feeder circuit based on the difference between the first voltage value and the second value, and executes adjustment processing for adjusting circuit characteristics with use of an adjustment unit in accordance with the obtained feeder circuit reactance in such a manner that the feeder circuit impedance is a predetermined impedance.

7 Claims, 6 Drawing Sheets

(56) References Cited

U.S. PATENT DOCUMENTS

| | | | | |
|---|---|---|---|---|
| 2009/0003022 A1* | 1/2009 | Nunoya | ................... | H02J 50/40 |
| | | | | 363/78 |
| 2012/0161530 A1* | 6/2012 | Urano | ................... | H04B 5/0087 |
| | | | | 307/104 |
| 2013/0009475 A1* | 1/2013 | Nunoya | ................... | H02J 50/50 |
| | | | | 307/43 |
| 2013/0334895 A1* | 12/2013 | Yamamoto | .............. | H02J 50/12 |
| | | | | 307/104 |
| 2013/0334896 A1* | 12/2013 | Yamamoto | .............. | H01F 38/14 |
| | | | | 307/104 |
| 2015/0362973 A1* | 12/2015 | Tsai | ........................ | G06F 1/266 |
| | | | | 713/322 |
| 2016/0243944 A1* | 8/2016 | Staunton | ................ | B60L 5/005 |
| 2017/0305282 A1* | 10/2017 | Obayashi | ............... | B60L 53/122 |
| 2018/0183268 A1* | 6/2018 | Matsuno | ................. | H02J 50/80 |
| 2022/0063909 A1* | 3/2022 | Yoon | ..................... | B60L 53/122 |
| 2023/0211670 A1* | 7/2023 | Tomita | ................... | H02J 50/12 |
| | | | | 191/10 |
| 2023/0238832 A1* | 7/2023 | Nishimura | .............. | H02J 50/80 |
| | | | | 307/104 |
| 2023/0253826 A1* | 8/2023 | Matsubara | ............. | H02J 50/80 |
| | | | | 307/104 |

\* cited by examiner

NON-CONTACT POWER SUPPLY FACILITY, IMPEDANCE ADJUSTMENT METHOD FOR NON-CONTACT POWER SUPPLY FACILITY, AND IMPEDANCE ADJUSTMENT PROGRAM FOR NON-CONTACT POWER SUPPLY FACILITY

CROSS-REFERENCE TO RELATED APPLICATION

This application claims priority to Japanese Patent Application No. 2021-181420 filed Nov. 5, 2021, the disclosure of which is hereby incorporated by reference in its entirety.

BACKGROUND OF THE INVENTION

1. Field of the Invention

The present invention relates to a technology for adjusting feeder circuit impedance, which is the impedance of a feeder circuit that includes a feeder line and a power supply device, in a non-contact power supply facility that includes a plurality of feeder lines aligned with a movement path of a mobile body equipped with a power receiving device, and power supply devices connected to corresponding feeder lines and configured to supply an alternating current to the feeder lines, and supplies electric power to the power receiving device in a non-contact manner.

2. Description of the Related Art

JP H11-155245A discloses a technology for adjusting feeder circuit impedance in a non-contact power supply facility such as the aforementioned facility. In this document, it is determined whether or not the difference between the resonance frequency in a resonance circuit provided in the power receiving device and the oscillation frequency in a power supply device is within a predetermined set range. If the difference is not within the set range, an inductance adjustment circuit is controlled to adjust an inductance value in the feeder circuit. In another method, if the difference is not within the set range, a capacitance adjustment circuit is controlled to adjust a capacitance value in the feeder circuit.

SUMMARY OF THE INVENTION

In recent years, the scale of traveling facilities (e.g., logistics facilities) equipped with this type of non-contact power supply facility has been increasing, and the non-contact power supply facility often includes a plurality of feeder circuits. The mobile body moves in a wide area within a traveling facility and therefore travels via a plurality of feeder circuits. Accordingly, the plurality of feeder lines are disposed next to each other in such a manner that the mobile body can constantly receive electric power via at least one feeder circuit. There is, therefore, a concern that, while the feeder circuit impedance in one feeder circuit is adjusted, the adjustment accuracy may be degraded due to the effects of other feeder circuits.

There is a demand for the provision of a technology that enables appropriate adjustment of the feeder circuit impedance by reducing the effects of other feeder circuits in a non-contact power supply facility that includes a plurality of feeder circuits.

In view of the above, a non-contact power supply facility is a non-contact power supply facility configured to supply electric power to a power receiving device in a non-contact manner, including: a plurality of feeder lines aligned with a movement path of a mobile body equipped with the power receiving device; and a plurality of power supply devices connected to corresponding feeder lines and configured to supply an alternating current to the feeder lines, each of the plurality of power supply devices including: a power supply circuit configured to output the alternating current to a corresponding one of the feeder lines; a power supply controller configured to control the power supply circuit; and an adjustment unit configured to adjust a circuit characteristic, which is at least either an inductance or a capacitance of a feeder circuit including a feeder line and a power supply device, the non-contact power supply facility further including an adjustment system configured to adjust the adjustment units of the plurality of power supply devices, wherein, with a target power supply device being a power supply device to be an adjustment target out of the plurality of power supply devices, a target feeder line being a feeder line connected to the target power supply device out of the plurality of feeder lines, an adjacent feeder line being another feeder line adjacent to the target feeder line out of the plurality of feeder lines, an adjacent power supply device being a power supply device connected to the adjacent feeder lines out of the plurality of power supply devices, and a regular power supply operation being an operation of the power supply devices to supply electric power to the mobile body, the adjustment system causes the target power supply device to execute first processing and second processing while causing at least one adjacent power supply device to perform the regular power supply operation, the first processing is processing for measuring a first voltage value, which is a value of a voltage on the target feeder line, while the power supply circuit of the target power supply device does not output the alternating current, the second processing is processing for measuring a second voltage value, which is a value of a voltage on the target feeder line, while the power supply circuit of the target power supply device outputs the alternating current, and the adjustment system executes, after executing the first processing and the second processing, adjustment processing for obtaining a feeder circuit reactance, which is a reactance of the feeder circuit of the target power supply device, based on a difference between the first voltage value and the second voltage value, and adjusting the circuit characteristic with use of the adjustment unit in accordance with the obtained feeder circuit reactance in such a manner that a feeder circuit impedance, which is an impedance of the feeder circuit of the target power supply device, is a predetermined impedance.

According to this configuration, in the case where a plurality of feeder lines are aligned with the movement path of the mobile body, electrical characteristics of the feeder circuit that includes each feeder line and the power supply device connected thereto can be appropriately adjusted while giving consideration to the effects of the feeder lines adjacent to each feeder line. Further, circuit characteristics can be automatically adjusted with use of the adjustment unit under the control of the adjustment system. This can reduce man-hours for not only the installation of the non-contact power supply facility but also the operation to adjust the power supply circuits after the non-contact power supply facility starts running. Thus, according to this configuration, the feeder circuit impedance can be appropriately adjusted by reducing the effects of other feeder circuits in the non-contact power supply facility that includes a plurality of feeder circuits.

The technical features of the above-described non-contact power supply facility can also be applied to an impedance adjustment method for a non-contact power supply facility and an impedance adjustment program for a non-contact power supply facility. Typical example modes will be described below. For example, this adjustment method may include various types of processing with the features of the above-described non-contact power supply facility. Further, this adjustment program enables a computer to realize various functions with the features of the above-described non-contact power supply facility. The adjustment method and adjustment program can, of course, exhibit the operation and effects of the above-described non-contact power supply facility. Furthermore, as a preferable mode of the non-contact power supply facility, various additional features that will be described as examples in the following embodiment can also be incorporated into the adjustment method and the adjustment program, and the method and program can also exhibit the operation and effects corresponding to the respective additional features.

As one preferable mode, an impedance adjustment method for a non-contact power supply facility is an impedance adjustment method for a non-contact power supply facility for adjusting a feeder circuit impedance, which is an impedance of a feeder circuit including a feeder line and a power supply device, in a non-contact power supply facility configured to supply electric power to a power receiving device in a non-contact manner, the facility including: a plurality of feeder lines aligned with a movement path of a mobile body equipped with the power receiving device; and a plurality of power supply devices connected to corresponding feeder lines and configured to supply an alternating current to the feeder lines, each of the plurality of power supply devices including: a power supply circuit configured to output the alternating current to a corresponding one of the feeder lines; a power supply controller configured to control the power supply circuit; and an adjustment unit configured to adjust a circuit characteristic, which is at least either an inductance or a capacitance of the feeder circuit, with a target power supply device being a power supply device to be an adjustment target out of the plurality of power supply devices, a target feeder line being a feeder line connected to the target power supply device out of the plurality of feeder lines, an adjacent feeder line being another feeder line adjacent to the target feeder line out of the plurality of feeder lines, an adjacent power supply device being a power supply device connected to the adjacent feeder lines out of the plurality of power supply devices, and a regular power supply operation being an operation of the power supply devices to supply electric power to the mobile body, the method including: first processing for measuring a first voltage value, which is value of a voltage on the target feeder line, while at least one adjacent power supply device is caused to perform the regular power supply operation and the power supply circuit of the target power supply device does not output the alternating current; second processing for measuring a second voltage value, which is a value of a voltage on the target feeder line, while at least one adjacent power supply device is caused to perform the regular power supply operation and the power supply circuit of the target power supply device outputs the alternating current; and adjustment processing for obtaining, after executing the first processing and the second processing, a feeder circuit reactance, which is a reactance of the feeder circuit of the target power supply device, based on a difference between the first voltage value and the second voltage value, and adjusting the circuit characteristic with use of the adjustment unit in accordance with the obtained feeder circuit reactance in such a manner that the feeder circuit impedance of the feeder circuit of the target power supply device is a predetermined impedance.

As one preferable mode, an impedance adjustment program for a non-contact power supply facility is an impedance adjustment program for a non-contact power supply facility for causing a computer to realize functions of adjusting a feeder circuit impedance, which is an impedance of a feeder circuit including a feeder line and a power supply device, in a non-contact power supply facility configured to supply electric power to a power receiving device in a non-contact manner, the facility including: a plurality of feeder lines aligned with a movement path of a mobile body equipped with the power receiving device; and a plurality of power supply devices connected to corresponding feeder lines and configured to supply an alternating current to the feeder lines, each of the plurality of power supply devices including: a power supply circuit configured to output the alternating current to a corresponding one of the feeder lines; a power supply controller configured to control the power supply circuit; and an adjustment unit configured to adjust a circuit characteristic, which is at least either an inductance or a capacitance of the feeder circuit including a feeder line and a power supply device, with a target power supply device being a power supply device to be an adjustment target out of the plurality of power supply devices, a target feeder line being a feeder line connected to the target power supply device out of the plurality of feeder lines, an adjacent feeder line being another feeder line adjacent to the target feeder line out of the plurality of feeder lines, an adjacent power supply device being a power supply device connected to the adjacent feeder lines out of the plurality of power supply devices, and a regular power supply operation being an operation of the power supply devices to supply electric power to the mobile body, the program causing the computer to realize: a first function of measuring a first voltage value, which is value of a voltage on the target feeder line, while at least one adjacent power supply device is caused to perform the regular power supply operation and the power supply circuit of the target power supply device does not output the alternating current; a second function of measuring a second voltage value, which is a value of a voltage on the target feeder line, while at least one adjacent power supply device is caused to perform the regular power supply operation and the power supply circuit of the target power supply device outputs the alternating current; and an adjustment function of obtaining, after realizing the first function and the second function, a feeder circuit reactance, which is a reactance of the feeder circuit of the target power supply device, based on a difference between the first voltage value and the second voltage value, and adjusting the circuit characteristic with use of the adjustment unit in accordance with the obtained feeder circuit reactance in such a manner that the feeder circuit impedance of the feeder circuit of the target power supply device is a predetermined impedance.

Further features and advantages of the non-contact power supply facility, the impedance adjustment method for a non-contact power supply facility, and the impedance adjustment program for a non-contact power supply facility will be apparent from the following description of an exemplary and non-limiting embodiment described with reference to the drawings.

DESCRIPTION OF THE INVENTION

Figure 1:
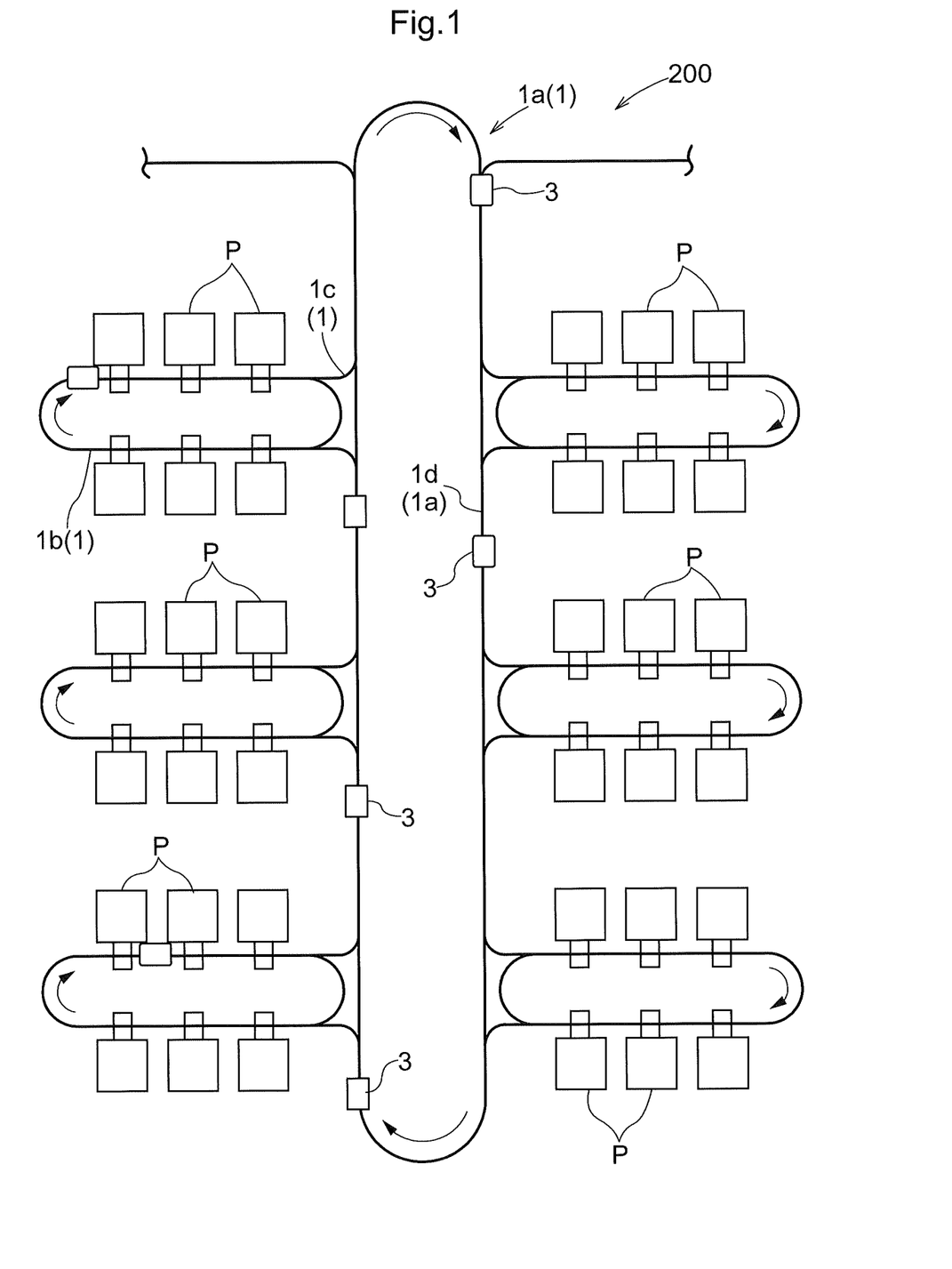
FIG. 1 is a plan view of an article transport facility equipped with a non-contact power supply facility.
Figure 2:
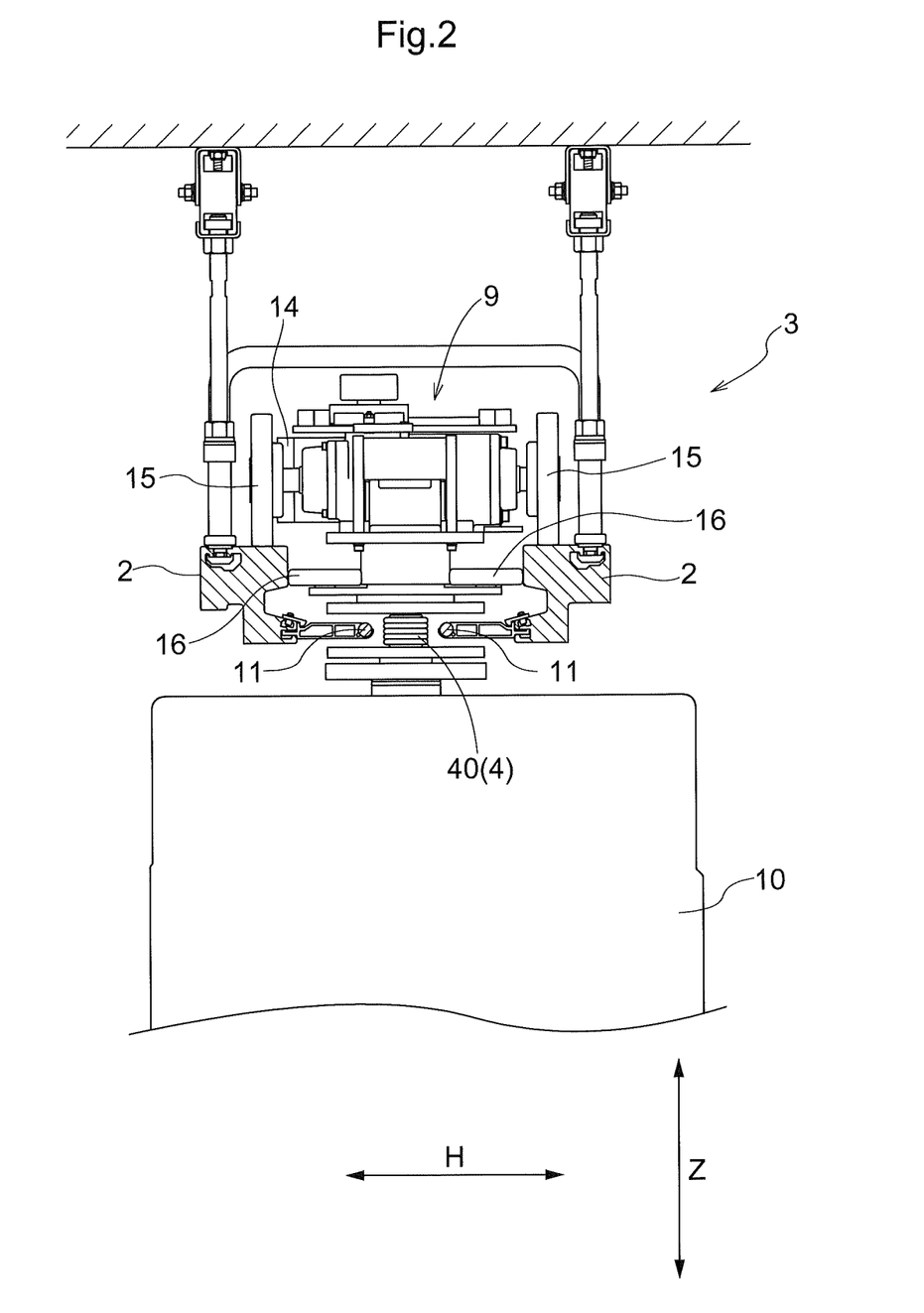
FIG. 2 is a front view of an article transport vehicle.

Hereinafter, an embodiment of a non-contact power supply facility will be described by taking as an example a mode used in an article transport facility, with reference to the drawings. As shown in FIGS. 1 and 2, an article transport facility 200 according to the present embodiment includes travel rails 2 aligned with a movement path 1, which is a travel path of article transport vehicles 3 (mobile bodies), and the article transport vehicles 3 that travel along the movement path 1 while being guided by the travel rails 2. For example, the movement path 1 includes one loop-shaped primary path 1a, loop-shaped secondary paths 1b that pass through a plurality of article processing sections P, and connecting paths 1c that connect the primary path 1a to the secondary paths 1b. The article transport vehicles 3 in the present embodiment travel in the movement path 1 unidirectionally in the direction indicated by arrows. Articles to be transported by the article transport vehicles 3 in the present embodiment are, for example, front opening unified pods (FOUPs) for housing a semiconductor substrate, glass substrates to be used as a display material, or the like.

Each article transport vehicle 3 in the present embodiment includes a traveling unit 9 that travels along the movement path 1 while being guided by a pair of travel rails 2 suspended and supported from a ceiling along the movement path 1, a transport vehicle body 10 positioned below the travel rails 2 and suspended and supported from the traveling unit 9, and a power receiving device 4 that receives, in a non-contact manner, driving power from a feeder line 11 laid out along the movement path 1, as shown in FIG. 2. The transport vehicle body 10 includes an article supporter (not shown) that can be raised and lowered and supports an article in a suspended manner.

The traveling unit 9 includes a pair of travel wheels 15 that are driven to rotate by an electric drive motor 14, as shown in FIG. 2. The travel wheels 15 roll on a traveling surface on upper surfaces of the respective travel rails 2. The traveling unit 9 also includes a pair of guide wheels 16 that freely rotate about respective axes parallel with the up-down direction Z and are in contact with inner surfaces of the two travel rails 2. The traveling unit 9 also includes a traveling drive motor 14, a drive circuits thereof, or the like, and causes the article transport vehicle 3 to travel along the travel rails 2. The transport vehicle body 10 includes an actuator for raising and lowering the article supporter, an actuator for driving a holder for holding the article, and the like, as well as drive circuits and the like of these actuators.

Electric power for the drive motor 14, various actuators, drive circuits for driving these components, and so on, is supplied from the feeder lines 11 to the power receiving device 4 in a non-contact manner. As mentioned above, the feeder lines 11 for supplying driving power to the article transport vehicle 3 via the power receiving device 4 is laid out along the movement path 1. The feeder lines 11 in the present embodiment are located on the respective sides in a path-width direction H relative to the power receiving device 4.

The power receiving device 4 in the present embodiment supplies driving power to the article transport vehicle 3 by means of a wireless power supply technology called HID (High Efficiency Inductive Power Distribution Technology). Specifically, a high-frequency current is made to flow through a feeder line 11, which is an induction line, to generate a magnetic field around the feeder line 11. The power receiving device 4 includes a pick-up coil 40 and a magnetic core. The pick-up coil 40 is induced by electromagnetic induction from the magnetic field. The induced alternating-current power is converted to direct-current power by a rectifier circuit, such as a full-wave rectifier circuit, or a power receiving circuit with a smoothing capacitor or the like, and is supplied to the actuators and the drive circuits.

Figure 3:
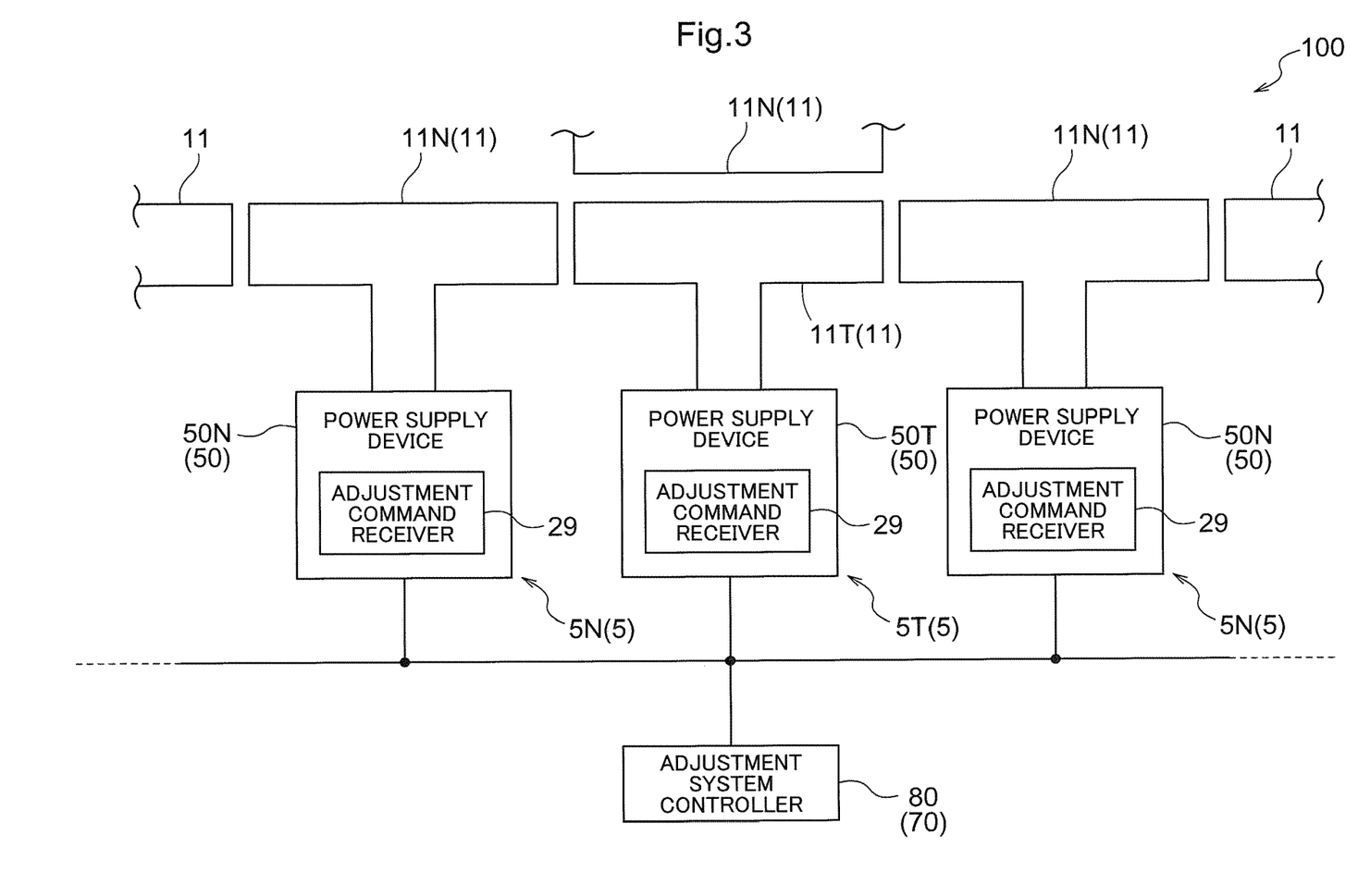
FIG. 3 is a schematic block diagram showing a system configuration of the non-contact power supply facility.
Figure 4:
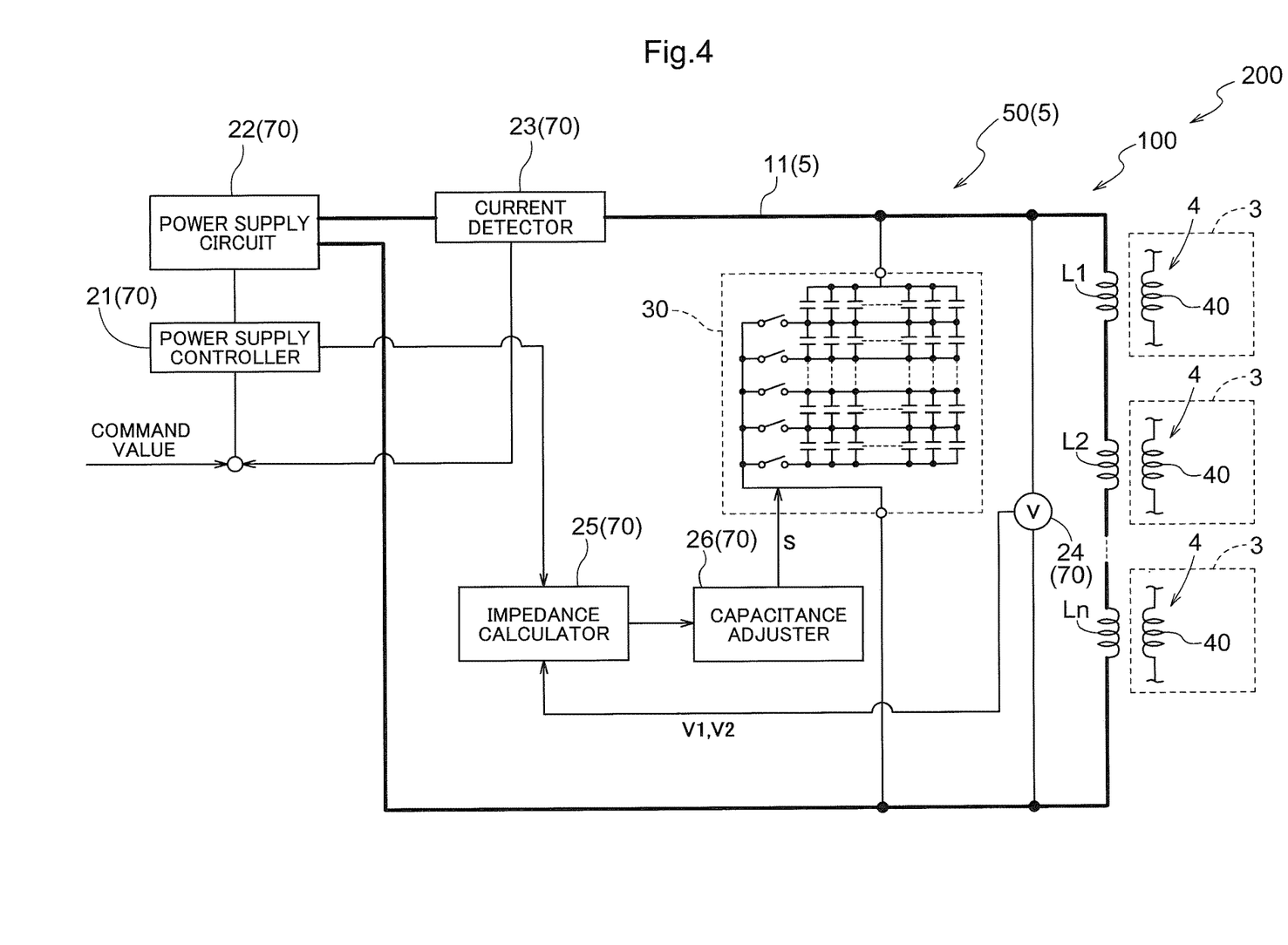
FIG. 4 is a schematic block diagram showing a configuration of pairs of a power supply device and a feeder line that receives power supply from the power supply device in the non-contact power supply facility.

The non-contact power supply facility 100 in the present embodiment is a facility that uses this type of wireless power supply technology to supply electric power in a non-contact manner to the article transport vehicle 3 serving as a mobile body. The non-contact power supply facility 100 includes a plurality of feeder lines 11 aligned with the movement path 1 of the article transport vehicle 3 (mobile body) equipped with the power receiving device 4, and power supply devices 50 that are connected to the respective feeder lines 11 and supplies an alternating current to the feeder lines 11, as shown in FIGS. 3 and 4. The non-contact power supply facility 100 supplies electric power to the power receiving device 4 in a non-contact manner. The article transport facility 200 includes one large loop-shaped primary path 1a, and a plurality of loop-shaped secondary paths 1b that are smaller than the primary path 1a, as described as an example with reference to FIG. 1. In a relatively large-scale article transport facility 200 of this kind, not only one but a plurality of pairs of a feeder line 11 and a power supply device 50 are provided (see FIG. 3) in order to suppress a decrease in the power transmission efficiency and keep the entire facility from stopping in case of failure.

Each feeder line 11 forms a closed circuit that is sufficiently long electrically, and is a distributed constant circuit. Therefore, the resistance, inductance, and capacitance that constitute the impedance of the feeder line 11 are distributed on the circuit. Feeder circuit impedance, which is the impedance of a feeder circuit 5 that includes a feeder line 11 and a power supply device 50, is often affected by inductance, partially due to the effects of mutual inductance caused by coupling between the feeder line 11 and the pick-up coil 40 included in the power receiving device 4 of the article transport vehicle 3. The non-contact power supply facility 100 of the present embodiment is characterized by appropriately adjusting the feeder circuit impedance. For this reason, FIG. 4 shows an equivalent circuit diagram with inductances (L1, L2, . . . , Ln) as lumped constants at positions corresponding to the pick-up coils 40 of the power receiving device 4.

It is desirable that each power supply device 50 is capable of supplying power to the power receiving device 4 of each article transport vehicle 3 appropriately (i.e., with good electrical efficiency) via the feeder line 11 connected to this power supply device 50. As mentioned above, electric power is supplied in a non-contact manner as a result of a high-frequency current flowing through the feeder line 11, which is a conductor, and the feeder line 11 electromagnetically coupling with the pick-up coil 40. The power receiving device 4 includes a resonance circuit that resonates with the frequency of the high-frequency current flowing through the feeder line 11. Here, if the impedance of the feeder circuit 5 that includes the feeder line 11 (feeder circuit impedance) is shifted from the impedance (predetermined impedance) that realizes efficient power supply, the power supply efficiency decreases, and the loss increases. It is, therefore, favorable that the feeder circuit impedance in each feeder circuit 5 is appropriately adjusted.

However, the non-contact power supply facility 100 has a plurality of feeder circuits 5, as mentioned above. There are also cases where a non-contact power supply facility 100 in a large article transport facility 200 has as many as 100 to 300 feeder circuits 5. If operators manually adjust these feeder circuits 5, the adjustment requires considerable time and cost. For this reason, a later-described adjustment system 70 in the present embodiment automatically adjusts the feeder circuit impedance. Also, for example, the article transport vehicles 3 move in a wide area within the article transport facility 200, as shown in FIG. 1. In the case of a non-contact power supply facility 100 having a plurality of feeder circuits 5 as mentioned above, each article transport vehicle 3 travels via the plurality of feeder circuits 5. Accordingly, the feeder lines 11 that pertain to different feeder circuits 5 are next to each other so that the article transport vehicle 3 can receive electric power via at least one feeder circuit 5. There is, therefore, a concern that, while the feeder circuit impedance in one feeder circuit 5 is adjusted, the adjustment accuracy may be degraded due to the effects of other feeder circuits 5. The non-contact power supply facility 100 of the present embodiment is characterized by appropriately adjusting the feeder circuit impedance by reducing the effects of other feeder circuits 5.

Each of the plurality of power supply devices 50 includes a power supply circuit 22 that outputs an alternating current to the feeder line 11, a power supply controller 21 that controls the power supply circuit 22, and a capacitor array 30 (adjustment unit) that adjusts circuit characteristics, which are at least either the inductance or the capacitance of the feeder circuit 5 that includes the feeder line 11 and the power supply device 50, as shown in FIG. 4. Each power supply device 50 also includes an impedance calculator 25, a capacitance adjuster 26, and a voltage detector 24 for detecting the voltage on the feeder line 11 that constitute the later-described adjustment system 70.

The non-contact power supply facility 100 also includes an adjustment system controller 80, which is a controller in the adjustment system 70 that adjusts the capacitor array 30 (adjustment unit) pertaining to the plurality of power supply devices 50, as shown in FIG. 3. The adjustment system controller 80 has a processor capable of executing a program, such as a microcomputer, as a core, and gives adjustment commands to the power supply devices 50. Each power supply device 50 includes an adjustment command receiver 29, and adjusts the feeder circuit impedance based on the adjustment command. For example, the adjustment system controller 80 controls the power supply devices 50 by giving adjustment commands to the power supply devices 50 in such a manner that the plurality of power supply devices 50 implement the feeder circuit impedance adjustment sequentially, rather than simultaneously.

Note that, for example, each power supply device 50 may also have an operation switch or the like that can be operated by an operator in such a manner that an adjustment command is given by the operator operating the operation switch. That is, the feeder circuit impedance may also be adjusted by manual operation by the operator as well as the adjustment commands from the adjustment system controller 80. Alternatively, a configuration may be employed in which an adjustment request is sent from the power supply device 50 that has the operation switch to the adjustment system controller 80 by operating the operation switch that the operator can operate, and the adjustment system controller 80 transmits an adjustment command to the power supply device 50.

Such an operation switch, of course, need not be separately provided. For example, the operator may designate a power supply device 50 via the adjustment system controller 80 and make the designated power supply device 50 adjust the feeder circuit impedance.

As mentioned above, the non-contact power supply facility 100 includes a plurality of feeder circuits 5, each of which is a pair of a feeder line 11 and a power supply device 50, and the feeder circuit impedance is sequentially adjusted by selecting the feeder circuits 5 one by one. Here, a "target power supply device 50T" refers to one power supply device 50 to be an adjustment target, out of the plurality of power supply devices 50, a "target feeder line 11T" refers to a feeder line 11 connected to the target power supply device 50T, "adjacent feeder lines 11N" refer to other feeder lines 11 adjacent to the target feeder line 11T, and "adjacent power supply devices 50N" refer to power supply devices 50 connected to the adjacent feeder lines 11N, as shown in FIG. 3. Also, out of the plurality of feeder circuits 5, a "target feeder circuit 5T" refer to the pair of the target power supply device 50T and the target feeder line 11T, and "adjacent feeder circuits 5N" refer to pairs of an adjacent power supply device 50N and an adjacent feeder line 11N, as necessary. The operation of the power supply device 50 for supplying electric power to the article transport vehicle 3 is referred to as a "regular power supply operation".

Figure 6:
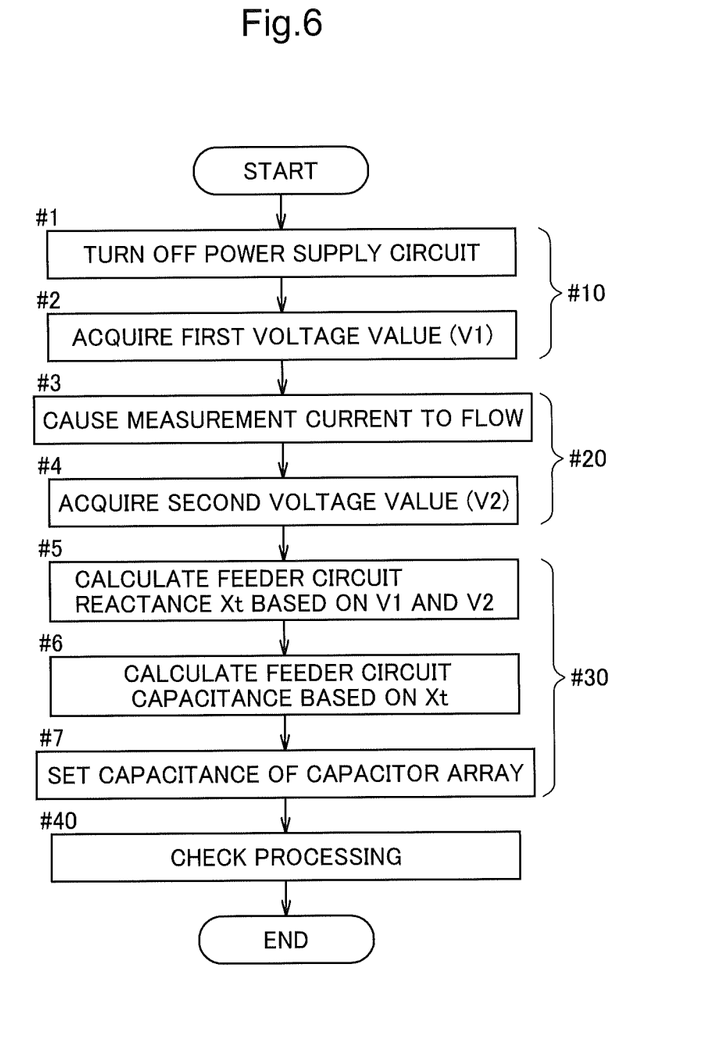
FIG. 6 is a flowchart showing an example procedure for adjusting feeder circuit impedance.

The adjustment system 70 causes the target power supply device 50T to execute later-described first processing #10 and second processing #20 while causing at least one adjacent power supply device 50N to perform the regular power supply operation (see FIG. 6). The first processing #10 is processing for measuring a first voltage value V1, which is the voltage on the target feeder line 11T while the power supply circuit 22 of the target power supply device 50T does not output an alternating current. The second processing #20 is processing for measuring a second voltage value V2, which is the voltage on the target feeder line 11T while the power supply circuit 22 of the target power supply device 50T outputs an alternating current. Note that the alternating current output by the power supply circuit 22 during the second processing #20 may be the same alternating current (several tens of amperes) as that during the regular power supply operation, but preferably a small alternating current (several mA to several A). After executing the first processing #10 and the second processing #20, the adjustment system 70 obtains a feeder circuit reactance (feeder circuit inductance Lt), which is the reactance of the feeder circuit 5 (target feeder circuit 5T) of the target power supply device 50T, based on the difference between the first voltage value V1 and the second voltage value V2. The adjustment system 70 then executes adjustment processing #30 for adjusting circuit characteristics (feeder circuit impedance) with use of the capacitor array 30 (adjustment unit) in accordance with the feeder circuit reactance in such a manner that the feeder circuit impedance, which is the impedance of the target feeder circuit 5T, is a predetermined impedance (see FIG. 6). Note that either the first processing #10 or the second processing #20 may be executed first.

As mentioned above, each of the plurality of power supply devices 50 has the adjustment command receiver 29 that receives adjustment commands, namely commands to adjust the feeder circuit impedance in this power supply device 50. If the adjustment command receiver 29 receives an adjustment command, the adjustment system 70 regards the power supply device 50 that has the adjustment command receiver 29 that has received the adjustment command as the target power supply device 50T, and executes the first processing #10, the second processing #20, and the adjustment processing #30.

The details of the power supply device 50 will now be described. The power supply circuit 22 has a switching power supply circuit with an inverter circuit as a core, for example. The power supply controller 21 controls the duty cycle of a switching control signal for switching a switching element included in the inverter circuit, based on a command value. That is, for example, the power supply controller 21 causes the power supply circuit 22 to output an alternating current by means of pulse width modulation (PWM). Here, the command value is, for example, a current value (which may be either an effective value or a peak value (peak-to-peak value)), or a duty cycle of PWM control. The power supply device 50 also includes a current detector 23 for detecting the alternating current output from the power supply circuit 22. If the command value is a current value, the power supply controller 21 performs feedback control based on the difference between the command value and the current value detected by the current detector 23 in such a manner that the power supply circuit 22 outputs an alternating current corresponding to the command value.

Thus implementing feedback control makes the current value of the alternating current output from the power supply circuit 22 correspond to the command value, for example. Here, even if the command value is a current value, the duty cycle of PWM control also falls within a certain predetermined range as per the specifications of the feeder circuit 5. Accordingly, it can be said that there is also a command value for the duty cycle of the power supply controller 21. If the power supply controller 21 executes feedback control based on the current value detected by the current detector 23 as mentioned above, the current value of the alternating current output from the power supply circuit 22 is a value corresponding to the command value even if, for example, the feeder circuit impedance deviates from the predetermined impedance. However, the duty cycle of PWM control by the power supply controller 21 is more likely to become out of the predetermined range. The duty cycle of PWM control becoming out of the predetermined range means a decrease in power supply efficiency and a decrease in efficiency in the non-contact power supply facility 100. For this reason, the non-contact power supply facility 100 in the present embodiment adjusts the feeder circuit impedance in such a manner that the feeder circuit impedance is the predetermined impedance.

Note that the power supply controller 21 or the impedance calculator 25 can determine whether or not the duty cycle of PWM control by the power supply controller 21 is out of the predetermined range. Accordingly, the power supply controller 21 or the impedance calculator 25 can also execute check processing (which will be described later) to determine whether or not the feeder circuit impedance has been appropriately adjusted, based on the duty cycle of PWM control.

The voltage detector 24 detects the voltage across the feeder line 11. This voltage value may also be an effective value or a peak value, as with the current value. The voltage detector 24 detects the voltage (instantaneous value) at a predetermined sampling period and provides the detected value to the impedance calculator 25. Note that the voltage value is detected based on a plurality of sampling values, not only in the case of an effective value but also in the case of a peak value. In the case of a peak value, the peak value may be calculated based on an average value of a plurality of peak values and an average value of a plurality of bottom values. The voltage value calculation based on the results of multiple samplings (instantaneous values) may be implemented by either the impedance calculator 25 or the voltage detector 24.

The first voltage value V1 detected in the first processing #10 is a voltage value of the target feeder line 11T while the power supply circuit 22 of the target power supply device 50T does not output an alternating current. In contrast, the second voltage value V2 detected in the second processing #20 is a voltage value of the target feeder line 11T while the power supply circuit 22 of the target power supply device 50T outputs an alternating current. The adjacent power supply device 50N performs the regular power supply operation and outputs an alternating current to the adjacent feeder line 11N during both the first processing #10 and the second processing #20. It is favorable that the adjacent power supply device 50N performs the same regular power supply operation to match the conditions in the first processing #10 with those in the second processing #20. If a plurality of adjacent feeder lines 11N correspond to the target feeder line 11T, it is desirable that all the adjacent feeder lines 11N receive the supply of an alternating current through the regular power supply operation. However, if the conditions are the same during the execution of the first processing #10 and the execution of the second processing #20, a configuration may also be employed in which at least one adjacent power supply device 50N performs the regular power supply operation to supply an alternating current to the adjacent feeder line 11N.

The impedance calculator 25 calculates a difference voltage V3 (=V2−V1), which is the difference between the first voltage value V1 and the second voltage value V2, after the first processing #10 and the second processing #20 have been executed. Both the first voltage value V1 and the second voltage value V2 include voltages generated due to an induced current, which is induced by the current flowing through the adjacent feeder line 11N, flowing through the target feeder line 11T. These voltages are substantially the same if the aforementioned operation conditions regarding the adjacent feeder line 11N are the same. Accordingly, the voltage caused by the induced current is canceled from the difference voltage V3, and only the voltage based on the alternating current output by the power supply circuit 22 of the target power supply device 50T is left. This voltage is expressed by the following equation (1), where Zt denotes the feeder circuit impedance, Rt and Xt denote the resistance component and the reactance component, respectively, and It denotes the current value output by the power supply circuit 22 during the second processing #20 (j is an imaginary unit).

$$V3 = Zt \cdot It = (Rt + jXt)It \qquad (1)$$

The reactance component (feeder circuit reactance Xt) includes an inductive reactance $X_L$ deriving from inductance, and a capacitive reactance $X_C$ deriving from capacitance, and is expressed by the following equation (2), where fa denotes the frequency of the alternating current output by the power supply circuit 22. In the equation (2), Lt denotes the inductance of the feeder circuit 5 (feeder circuit inductance), and Ct denotes the capacitance of the feeder circuit 5 (feeder circuit capacitance).

$$jXt = jX_L - jX_C = j2\pi faLt + (1/j2\pi faCt) \qquad (2)$$

Here, the resistance component Rt included in the feeder circuit impedance Zt is a constant value and does not depend on the frequency fa. If the frequency fa is a high frequency as in the present embodiment, there are cases where the resistance component Rt can be ignored since the reactance component (Xt) dependent on the frequency fa is large. Also, the resistance component Rt can be made a known constant based on prior measurement or the like. That is, the equation (1) can be made an equation of the reactance component (Xt) and the difference voltage V3 by ignoring the resistance component Rt or subtracting the voltage generated by the resistance component Rt from the difference voltage V3. In the present embodiment, the resistance component Rt in the above equation (1) is ignored to simplify the description (see the following equation (3)).

$$V3 = jXt \cdot It = (jX_L - jX_C)It \quad (3)$$

From the equation (3), the feeder circuit reactance Xt is expressed by the following equation (4).

$$jXt = V3/It \quad (4)$$

Here, Zr denotes the predetermined impedance for the feeder circuit 5. The resistance component Rt is known or can be ignored, as mentioned above. Also, in the present embodiment, the capacitor array 30 (adjustment unit) adjusts circuit characteristics (feeder circuit impedance Zt) during the adjustment processing #30, as mentioned above. That is, the feeder circuit impedance Zt is adjusted by means of the capacitive reactance $X_C$ of the capacitor array 30 (see the following equation (5)). In the following equation (5), this capacitive reactance $X_C$ is denoted as an adjustment reactance $X_{CA}$, and CA denotes the capacitance of the capacitor array 30.

$$Zr = Rt + jXt - jX_{CA} = \quad (5)$$
$$Rt + jXt - j(1/(2\pi fa \cdot CA)) = Rt + j(Xt - (1/(2\pi fa \cdot CA)))$$

The feeder circuit impedance Zt can be adjusted to become the predetermined impedance Zr by setting the capacitance of the capacitor array 30 (feeder circuit capacitance CA) in such a manner as to satisfy the equation (5).

Note that if the inductive reactance $X_L$ is more dominant in the feeder circuit reactance Xt obtained based on the difference voltage V3, the equations (3), (4), and (5) can be expressed as the following equations (6), (7), and (8) by ignoring the capacitive reactance $X_C$ and denoting the inductance of the feeder circuit 5 (feeder circuit inductance) as Lt.

$$V3 = jLt \cdot It \quad (6)$$
$$jLt = V3/(2\pi fa \cdot It) \quad (7)$$
$$Zr = Rt + j2\pi fa \cdot Lt - j(1/2\pi fa \cdot CA) = Rt + j(2\pi fa \cdot Lt - (1/2\pi fa \cdot CA)) \quad (8)$$

As mentioned above, the adjustment system controller 80 has a processor capable of executing a program, such as a microcomputer, as a core. The power supply controller 21, the impedance calculator 25, the capacitance adjuster 26, and so on that constitute the power supply device 50 also have processors such as microcomputers as their cores. Accordingly, it is preferable that the aforementioned first processing #10, second processing #20, and adjustment processing #30 are realized by a program that is executed by processors (computers) in cooperation with peripheral elements, such as a memory (not shown).

For example, this type of processor (computer) executes a program (impedance adjustment program for a non-contact power supply facility) for causing the computer to realize functions of adjusting the feeder circuit impedance Zt, which is the impedance of the feeder circuit 5 that includes a feeder line 11 and a power supply device 50, in the non-contact power supply facility 100 that includes a plurality of feeder lines 11 aligned with the movement path 1 of the article transport vehicle 3 (mobile body) equipped with the power receiving device 4, and power supply devices 50 connected to corresponding feeder lines 11 and configured to supply an alternating current to the feeder lines 11, and supplies electric power to the power receiving device 4 in a non-contact manner. This processor (computer) realizes a first function (first processing #10), a second function (second processing #20), and an adjustment function (adjustment processing #30) by executing the program.

The first function (first processing #10) is a function (processing) of measuring the first voltage value V1, which is the voltage on the target feeder line 11T while at least one adjacent power supply device 50N performs the regular power supply operation and the power supply circuit 22 of the target power supply device 50T does not output an alternating current. First, for example, the power supply controller 21 of the target power supply device 50T turns off the power supply circuit 22 in such a manner that the power supply circuit 22 of the target power supply device 50T does not output an alternating current (#1), as shown in FIG. 6. Next, in this state, the impedance calculator 25 obtains the first voltage value V1 (#2). The first voltage value V1 is temporarily stored in a memory, a register, or the like that cooperates with the processor (computer).

The second function (second processing #20) is a function (processing) of measuring the second voltage value V2, which is the voltage on the target feeder line 11T while at least one adjacent power supply device 50N performs the regular power supply operation and the power supply circuit 22 of the target power supply device 50T outputs an alternating current. For example, the power supply controller 21 of the target power supply device 50T controls the power supply circuit 22 in such a manner as to cause the aforementioned small current to flow as a measurement current (#3). Then, in this state, the impedance calculator 25 obtains the second voltage value V2 (#4). The second voltage value V2 is also temporarily stored in a memory, a register, or the like that cooperates with the processor (computer).

The first function (first processing #10) and the second function (second processing #20) may be executed in this order, or may be executed in reverse order. After the execution of both the first function (first processing #10) and the second function (second processing #20) has been completed, the feeder circuit reactance Xt (feeder circuit inductance Lt), which is the reactance (inductance) of the feeder circuit 5 of the target power supply device 50T, is obtained based on the difference voltage V3, which is the difference between the first voltage value V1 and the second voltage value V2. Also, the adjustment function (adjustment processing #30) of adjusting the circuit characteristics with use of the capacitor array 30 (adjustment unit) is executed in accordance with the feeder circuit reactance Xt (feeder circuit inductance Lt) as follows in such a manner that the feeder circuit impedance Zt of the feeder circuit 5 of the target power supply device 50T is the predetermined impedance Zr.

As mentioned above, the impedance calculator 25 calculates the difference voltage V3 based on the first voltage value V1 and the second voltage value V2, and calculates the feeder circuit reactance Xt (feeder circuit inductance Lt) based on the difference voltage V3 (#5). The impedance calculator 25 then calculates the feeder circuit capacitance CA as an adjustment value based on the feeder circuit reactance Xt (feeder circuit inductance Lt) (#6). The impedance calculator 25 transmits the value of the feeder circuit capacitance CA to the capacitance adjuster 26, and the capacitance adjuster 26 sets the feeder circuit capacitance CA as the capacitance of the capacitor array 30 (#7).

Figure 5:
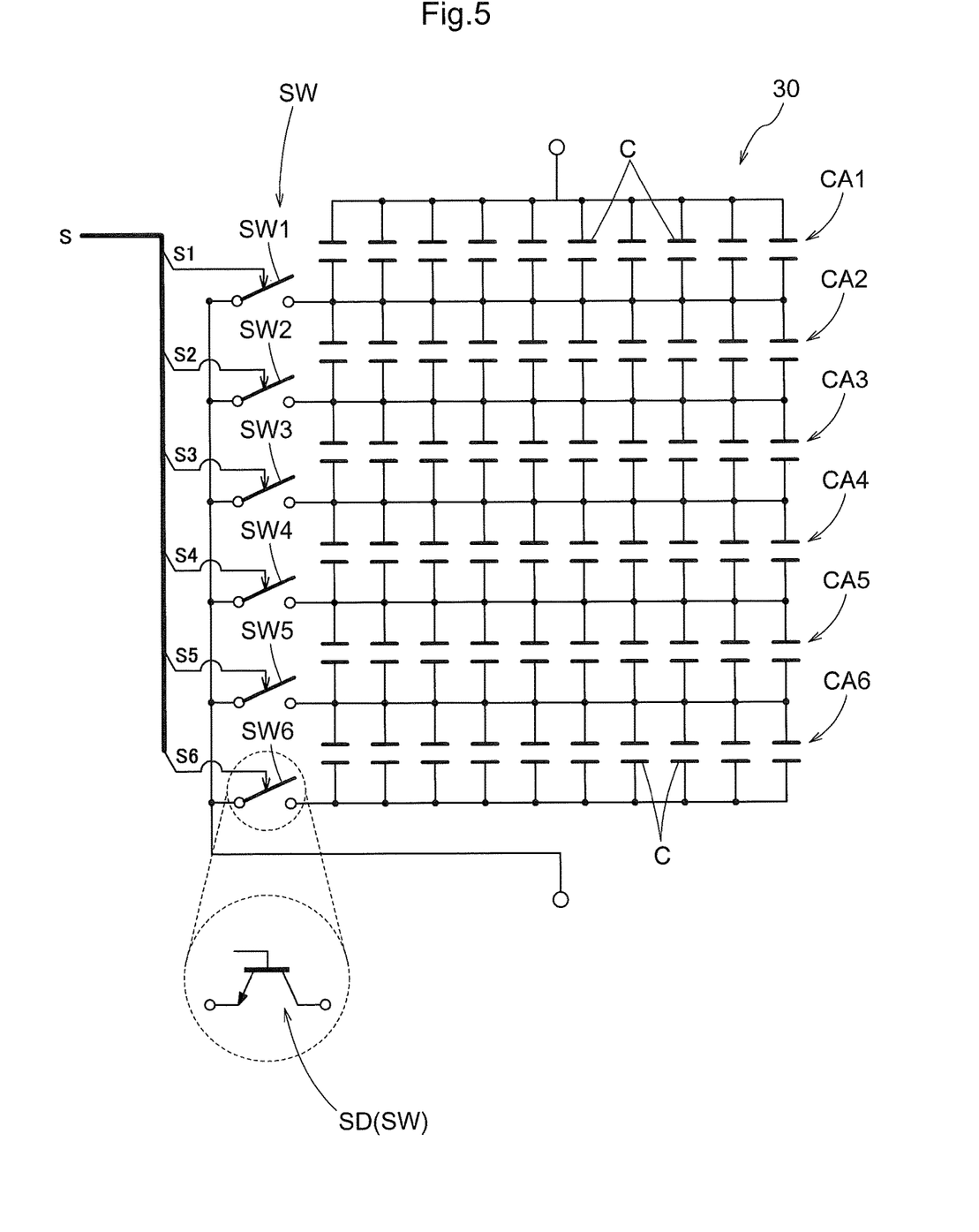
FIG. 5 is a schematic circuit block diagram showing an example configuration of a capacitor array.

In the capacitor array 30, for example, a first parallel array CA1, a second parallel array CA2, a third parallel array CA3, a fourth parallel array CA4, a fifth parallel array CA5, and a sixth parallel array CA6, in each of which a plurality of capacitors C are connected in parallel, are connected directly to each other, as shown in FIG. 5. One or more parallel arrays are selected from the six parallel arrays by exclusively turning on one switch out of a first switch SW1, a second switch SW2, a third switch SW3, a fourth switch SW4, a fifth switch SW5, and a sixth switch SW6. For example, upon the first switch SW1 turning on, the capacitors C of the first parallel array CA1 set the feeder circuit capacitance CA. Upon the second switch SW2 turning on, the capacitors included in a series circuit of the first parallel arrays CA1 and the second parallel array CA2 set the feeder circuit capacitance CA. The same applies to the cases where any of the third switch SW3 to the sixth switch SW6 turns on, which is clear from FIG. 5. Therefore, a detailed description is omitted.

The capacitance adjuster 26 controls the capacitor array 30 and sets the feeder circuit capacitance CA with use of control signals S (S1 to S6) that enables independent control of the first switch SW1 to the sixth switch SW6. One of the control signals (S1 to S6) is exclusively enabled (i.e., to turn on a switch SW). Note that each switch SW of the first switch SW1 to the sixth switch SW6 is a switching device SD (transistor, field effect transistor (FET)), an analog switch, or the like, as shown as an example in FIG. 5.

In the power supply device 50, the power supply controller 21 controls the output voltage of the power supply circuit 22 (i.e., performs feedback control as mentioned above) in such a manner that a current of a predetermined value flows through the feeder line 11 to which this power supply device 50 is connected. After executing the adjustment processing #30, the adjustment system 70 acquires supply power, which is electric power supplied to the feeder line 11 based on the voltage on the feeder line 11 and the current flowing through the feeder line 11. The adjustment system 70 then executes check processing #40 to determine whether or not the output voltage of the power supply circuit 22 is within an appropriate range relative to the supply power (see FIG. 6). If, for example, the feeder circuit impedance Zt is not appropriately adjusted, there are cases where the power supply efficiency decreases, the loss increases, and the supply power increases. If the current is feedback-controlled based on the command value, the voltage rises to maintain the output of the current in response to the loss, and the supply power increases. Accordingly, it is possible to determine whether or not the feeder circuit impedance Zt is appropriately adjusted by determining whether or not the output voltage of the power supply circuit 22 is within an appropriate range relative to the supply power.

The power supply controller 21 in the present embodiment controls the power supply circuit 22 by means of PWM control, as mentioned above. If the power supply circuit 22 has a voltage type inverter, the output voltage of the power supply circuit 22 changes based on the duty cycle of PWM control. Accordingly, the determination in the check processing #40 can be made based on whether or not the duty cycle is within an appropriate range. For example, the power supply controller 21 or the impedance calculator 25 can determine whether or not the duty cycle of PWM control by the power supply controller 21 is out of the predetermined range. Accordingly, the power supply controller 21 or the impedance calculator 25 can determine whether or not the feeder circuit impedance has been appropriately adjusted, based on the duty cycle of the PWM control. An alternative configuration may, of course, be employed in which the supply power is calculated based on the current value detected by the current detector 23 and the voltage value detected by the voltage detector 24, and whether or not this voltage value is within an appropriate range relative to the supply power is determined.

If it is determined through the above check processing #40 that the output voltage of the power supply circuit 22 is not within the appropriate range, the adjustment system 70 re-executes the first processing #10, the second processing #20, and the adjustment processing #30 for the target feeder line 11T.

Note that the non-contact power supply facility 100 has a plurality of feeder circuits 5, as mentioned above. Accordingly, if the impedance of one feeder circuit 5 (target power feeder circuit 5T) is readjusted based on the result of the check processing #40 for this feeder circuit 5 (target feeder circuit 5T), the adjustment of unadjusted feeder circuits 5 (the other feeder circuits 5 including the adjacent feeder circuits 5N) is postponed, resulting in an increase in the time required to complete the adjustment of all the feeder circuits 5. Therefore, the adjustment system 70 may first complete the first processing #10, the second processing #20, and the adjustment processing #30 for all pairs (feeder circuits 5) of a feeder line 11 and a power supply device 50, and thereafter execute the check processing #40 for each pair of a feeder line 11 and a power supply device 50.

Alternatively, the adjustment system 70 may first complete the first processing #10, the second processing #20, and the adjustment processing #30 for each pair of a feeder line 11 and a power supply device 50, subsequently execute the check processing #40 for this pair of the feeder line 11 and the power supply device 50, and store the result. After completing the first processing #10, the second processing #20, the adjustment processing #30, and the check processing #40 for all pairs of a feeder line 11 and a power supply device 50, the adjustment system 70 may sequentially readjust pairs of a feeder line 11 and a power supply device 50 that failed in the check processing #40.

There are cases where some pairs of a feeder line 11 and a power supply device 50 still fail in the determination in the check processing #40 even after the readjustment is thus implemented. It is possible that the detection accuracy for the first voltage value V1 and the second voltage value V2 is low in these pairs. If the determination result of the check processing #40 does not fall within an appropriate range even after the adjustment processing #30 has been performed a predetermined number of times, the adjustment system 70 may lengthen at least either a first sampling period, which is a period for measuring the first voltage value V1 through the first processing #10, or a second sampling period, which is a period for measuring the second voltage value V2 through the second processing #20. The effects of noise components or the like can be reduced by lengthening the sampling period.

Note that it is possible that the determination result in the check processing #40 for such pairs does not fall within the appropriate range even if the sampling period is lengthened. In this case, it is also possible that the feeder line 11 and/or the power supply device 50 is aging. Accordingly, the sampling period need not be lengthened if the determination result of the check processing #40 does not fall within the appropriate range even after the adjustment processing #30 has been performed a predetermined number of times. In this case, it is favorable that a worker inspects and repairs such pairs of a feeder line 11 and a power supply device 50.

Other embodiments will be described below. Note that the configuration of each embodiment described below is not only applied independently but may also be applied in combination with configurations of other embodiments as long as no contradictions arise.

(1) A description has been given above of an example mode in which the feeder circuit impedance Zt is adjusted by the capacitive reactance $X_C$ of the capacitor array 30 after the feeder circuit reactance Xt is obtained. However, the feeder circuit impedance Zt may alternatively be adjusted by the inductive reactance $X_L$. In this case, it is preferable that the inductance is set by an inductor array (not shown) instead of the capacitor array 30. Further, the feeder circuit impedance Zt may be adjusted by both the capacitive reactance $X_C$ and the inductive reactance $X_L$.

(2) A description has been given above of an example mode in which the check processing #40 is executed after the feeder circuit impedance Zt is adjusted, but the check processing #40 need not necessarily be implemented. If, for example, the feeder circuit impedance Zt is periodically implemented, readjustment is also implemented at an early stage for a pair that fails in the adjustment processing #40. Particularly, the check processing #40 need not be executed if adjustment is constantly implemented, as in the case of starting the adjustment from the first pair immediately after the adjustment of all pairs of a feeder line 11 and a power supply device 50 is completed (i.e., after one round of adjustment is finished).

(3) A description has been given above of an example mode in which each of the plurality of power supply devices 50 executes the first processing #10, the second processing #20, and the adjustment processing #30 upon the adjustment command receiver 29 receiving an adjustment command. However, each power supply device 50 need not have the adjustment command receiver 29. For example, each of the plurality of power supply devices 50 may autonomously serve as a target power supply device 50T to perform adjustment. In this case, a mode may be employed in which the target power supply device 50T performs adjustment in cooperation with the adjacent power supply device(s) 50N through communication or the like.

The following is a brief summary of the above-described non-contact power supply facility, impedance adjustment method for a non-contact power supply facility, and impedance adjustment program for a non-contact power supply facility.

As one mode, a non-contact power supply facility is a non-contact power supply facility configured to supply electric power to a power receiving device in a non-contact manner, including: a plurality of feeder lines aligned with a movement path of a mobile body equipped with the power receiving device; and a plurality of power supply devices connected to corresponding feeder lines and configured to supply an alternating current to the feeder lines, each of the plurality of power supply devices including: a power supply circuit configured to output the alternating current to a corresponding one of the feeder lines; a power supply controller configured to control the power supply circuit; and an adjustment unit configured to adjust a circuit characteristic, which is at least either an inductance or a capacitance of a feeder circuit including a feeder line and a power supply device, the non-contact power supply facility further including an adjustment system configured to adjust the adjustment units of the plurality of power supply devices, wherein, with a target power supply device being a power supply device to be an adjustment target out of the plurality of power supply devices, a target feeder line being a feeder line connected to the target power supply device out of the plurality of feeder lines, an adjacent feeder line being another feeder line adjacent to the target feeder line out of the plurality of feeder lines, an adjacent power supply device being a power supply device connected to the adjacent feeder lines out of the plurality of power supply devices, and a regular power supply operation being an operation of the power supply devices to supply electric power to the mobile body, the adjustment system causes the target power supply device to execute first processing and second processing while causing at least one adjacent power supply device to perform the regular power supply operation, the first processing is processing for measuring a first voltage value, which is a value of a voltage on the target feeder line, while the power supply circuit of the target power supply device does not output the alternating current, the second processing is processing for measuring a second voltage value, which is a value of a voltage on the target feeder line, while the power supply circuit of the target power supply device outputs the alternating current, and the adjustment system executes, after executing the first processing and the second processing, adjustment processing for obtaining a feeder circuit reactance, which is a reactance of the feeder circuit of the target power supply device, based on a difference between the first voltage value and the second voltage value, and adjusting the circuit characteristic with use of the adjustment unit in accordance with the obtained feeder circuit reactance in such a manner that a feeder circuit impedance, which is an impedance of the feeder circuit of the target power supply device, is a predetermined impedance.

According to this configuration, in the case where a plurality of feeder lines are aligned with the movement path of the mobile body, electrical characteristics of each feeder circuit that includes a feeder line and a power supply device connected thereto can be appropriately adjusted while giving consideration to the effects of adjacent feeder lines. Further, circuit characteristics can be automatically adjusted with use of the adjustment unit under the control of the adjustment system. This can reduce man-hours not only for the installation of the non-contact power supply facility but also for the operation to adjust the power supply circuits after the non-contact power supply facility has started running. Thus, according to this configuration, the feeder circuit impedance can be appropriately adjusted by reducing the effects of other feeder circuits in the non-contact power supply facility that includes a plurality of feeder circuits.

Here, it is preferable that the power supply controller of each of the power supply devices controls an output voltage of the power supply circuit in such a manner that a current of a predetermined value flows through the feeder line to which the power supply device is connected, and the adjustment system, after executing the adjustment processing, acquires supply power, which is electric power supplied to each of the feeder lines based on a voltage on the feeder line and a current flowing through the feeder line, executes check processing for determining whether or not the output voltage of the power supply circuit is within an appropriate range relative to the supply power, and, in response to determining through the check processing that the output voltage is not within the appropriate range, re-executes the first processing, the second processing, and the adjustment processing.

According to this configuration, the adjustment system can check whether or not circuit characteristics of the feeder circuits have been appropriately adjusted. In addition, the adjustment system can appropriately perform readjustment if the feeder circuit impedance has not been appropriately adjusted.

It is preferable that the adjustment system executes the check processing for each pair of a feeder line and a power supply device after completing the first processing, the second processing, and the adjustment processing for all pairs of a feeder line and a power supply device.

If the adjustment processing is executed for the target power supply device and thereafter the first processing, the second processing, and the adjustment processing are executed for an adjacent power supply device of the target power supply device, there are cases where the adjustment of circuit characteristics of the adjacent power supply device affects circuit characteristics of the target power supply device that has been subjected to the adjustment processing earlier. According to this configuration, the adjustment processing is first completed for all pairs of a feeder line and a power supply device, and thereafter the check processing is executed for each pair of a feeder line and a power supply device. Therefore, the check processing can be appropriately executed while reflecting the results of the adjustment processing for each power supply device. Also, readjustment can be performed, if necessary, based on the results of the check processing.

It is preferable that in response to, in the check processing, the output voltage not falling within the appropriate range even after the adjustment processing has been performed a predetermined number of times, the adjustment system lengthens at least either a first sampling period, which is a period of measuring the first voltage value through the first processing, or a second sampling period, which is a period of measuring the second voltage value through the second processing.

There are cases where the determination result of the check processing fails even after the measurement is performed a plurality of times due to the installation environment of the non-contact power supply facility (e.g., the number of adjacent power supply devices, the length of the feeder lines connected to the target power supply device and the adjacent power supply devices, and the load power conditions). In this case, lengthening the sampling period can increase the detection accuracy for the first and second voltage values and improve the probability of successful adjustment.

It is preferable that each of the plurality of power supply devices includes an adjustment command receiver configured to receive an adjustment command to adjust the feeder circuit impedance in the power supply device, and in response to the adjustment command receiving unit receiving the adjustment command, the adjustment system executes the first processing, the second processing, and the adjustment processing for the target power supply device that is the power supply device including the adjustment command receiver that received the adjustment command.

According to this configuration, it is possible to not only sequentially adjust all the power supply devices, but also separately adjust some of the plurality of power supply devices.

Various technical features of the above-described non-contact power supply facility can also be applied to an impedance adjustment method for a non-contact power supply facility, an impedance adjustment program for a non-contact power supply facility, and a computer-readable recording medium on which this program is recorded. Typical example modes will be described below. For example, this adjustment method may include various types of processing with the features of the above-described non-contact power supply facility. Further, this adjustment program enables a computer to realize various functions with the features of the above-described non-contact power supply facility. The program recorded on the recording medium can cause a computer to realize various functions with the features of the above-described non-contact power supply facility. The adjustment method, the adjustment program, and the program recorded on the recording medium can, of course, exhibit the operation and effects of the above-described non-contact power supply facility. Furthermore, as a preferable mode of the non-contact power supply facility, various additional features described as examples above can be incorporated in the adjustment method, the adjustment program, and the program recorded on the recording medium. The adjustment method, the adjustment program, and the program recorded on the recording medium can also exhibit the operation and effects corresponding to the respective additional features.

As one preferable mode, an impedance adjustment method for a non-contact power supply facility is an impedance adjustment method for a non-contact power supply facility for adjusting a feeder circuit impedance, which is an impedance of a feeder circuit including a feeder line and a power supply device, in a non-contact power supply facility configured to supply electric power to a power receiving device in a non-contact manner, the facility including: a plurality of feeder lines aligned with a movement path of a mobile body equipped with the power receiving device; and a plurality of power supply devices connected to corresponding feeder lines and configured to supply an alternating current to the feeder lines, each of the plurality of power supply devices including: a power supply circuit configured to output the alternating current to a corresponding one of the feeder lines; a power supply controller configured to control the power supply circuit; and an adjustment unit configured to adjust a circuit characteristic, which is at least either an inductance or a capacitance of the feeder circuit, with a target power supply device being a power supply device to be an adjustment target out of the plurality of power supply devices, a target feeder line being a feeder line connected to the target power supply device out of the plurality of feeder lines, an adjacent feeder line being another feeder line adjacent to the target feeder line out of the plurality of feeder lines, an adjacent power supply device being a power supply device connected to the adjacent feeder lines out of the plurality of power supply devices, and a regular power supply operation being an operation of the power supply devices to supply electric power to the mobile body, the method including: first processing for measuring a first voltage value, which is value of a voltage on the target feeder line, while at least one adjacent power supply device is caused to perform the regular power supply operation and the power supply circuit of the target power supply device does not output the alternating current; second processing for measuring a second voltage value, which is a value of a voltage on the target feeder line, while at least one adjacent power supply device is caused to perform the regular power supply operation and the power supply circuit of the target power supply device outputs the alternating current; and adjustment processing for obtaining, after executing the first processing and the second processing, a feeder circuit reactance, which is a reactance of the feeder circuit of the target power supply device, based on a difference between the first voltage value and the second voltage value, and adjusting the circuit characteristic with use of the adjustment unit in accordance with the obtained feeder circuit reactance in such a manner that the feeder circuit impedance of the feeder circuit of the target power supply device is a predetermined impedance.

As one preferable mode, an impedance adjustment program for a non-contact power supply facility is an impedance adjustment program for a non-contact power supply facility for causing a computer to realize functions of adjusting a feeder circuit impedance, which is an impedance of a feeder circuit including a feeder line and a power supply device, in a non-contact power supply facility configured to supply electric power to a power receiving device in a non-contact manner, the facility including: a plurality of feeder lines aligned with a movement path of a mobile body equipped with the power receiving device; and a plurality of power supply devices connected to corresponding feeder lines and configured to supply an alternating current to the feeder lines, each of the plurality of power supply devices including: a power supply circuit configured to output the alternating current to a corresponding one of the feeder lines; a power supply controller configured to control the power supply circuit; and an adjustment unit configured to adjust a circuit characteristic, which is at least either an inductance or a capacitance of the feeder circuit including a feeder line and a power supply device, with a target power supply device being a power supply device to be an adjustment target out of the plurality of power supply devices, a target feeder line being a feeder line connected to the target power supply device out of the plurality of feeder lines, an adjacent feeder line being another feeder line adjacent to the target feeder line out of the plurality of feeder lines, an adjacent power supply device being a power supply device connected to the adjacent feeder lines out of the plurality of power supply devices, and a regular power supply operation being an operation of the power supply devices to supply electric power to the mobile body, the program causing the computer to realize: a first function of measuring a first voltage value, which is value of a voltage on the target feeder line, while at least one adjacent power supply device is caused to perform the regular power supply operation and the power supply circuit of the target power supply device does not output the alternating current; a second function of measuring a second voltage value, which is a value of a voltage on the target feeder line, while at least one adjacent power supply device is caused to perform the regular power supply operation and the power supply circuit of the target power supply device outputs the alternating current; and an adjustment function of obtaining, after realizing the first function and the second function, a feeder circuit reactance, which is a reactance of the feeder circuit of the target power supply device, based on a difference between the first voltage value and the second voltage value, and adjusting the circuit characteristic with use of the adjustment unit in accordance with the obtained feeder circuit reactance in such a manner that the feeder circuit impedance of the feeder circuit of the target power supply device is a predetermined impedance.

As one preferable mode, a computer-readable recording medium on which an impedance adjustment program for a non-contact power supply facility is recorded is a recording medium on which an impedance adjustment program for a non-contact power supply facility is recorded that causes a computer to realize functions of adjusting a feeder circuit impedance, which is an impedance of a feeder circuit including a feeder line and a power supply device, in a non-contact power supply facility configured to supply electric power to a power receiving device in a non-contact manner, the facility including: a plurality of feeder lines aligned with a movement path of a mobile body equipped with the power receiving device; and a plurality of power supply devices connected to corresponding feeder lines and configured to supply an alternating current to the feeder lines, each of the plurality of power supply devices including: a power supply circuit configured to output the alternating current to a corresponding one of the feeder lines; a power supply controller configured to control the power supply circuit; and an adjustment unit configured to adjust a circuit characteristic, which is at least either an inductance or a capacitance of the feeder circuit including a feeder line and a power supply device, with a target power supply device being a power supply device to be an adjustment target out of the plurality of power supply devices, a target feeder line being a feeder line connected to the target power supply device out of the plurality of feeder lines, an adjacent feeder line being another feeder line adjacent to the target feeder line out of the plurality of feeder lines, an adjacent power supply device being a power supply device connected to the adjacent feeder lines out of the plurality of power supply devices, and a regular power supply operation being an operation of the power supply devices to supply electric power to the mobile body, the program causing the computer to realize: a first function of measuring a first voltage value, which is value of a voltage on the target feeder line, while at least one adjacent power supply device is caused to perform the regular power supply operation and the power supply circuit of the target power supply device does not output the alternating current; a second function of measuring a second voltage value, which is a value of a voltage on the target feeder line, while at least one adjacent power supply device is caused to perform the regular power supply operation and the power supply circuit of the target power supply device outputs the alternating current; and an adjustment function of obtaining, after realizing the first function and the second function, a feeder circuit reactance, which is a reactance of the feeder circuit of the target power supply device, based on a difference between the first voltage value and the second voltage value, and adjusting the circuit characteristic with use of the adjustment unit in accordance with the obtained feeder circuit reactance in such a manner that the feeder circuit impedance of the feeder circuit of the target power supply device is a predetermined impedance.

What is claimed is:

1. A non-contact power supply facility configured to supply electric power to a power receiving device in a non-contact manner, the non-contact power supply facility comprising:
   a plurality of feeder lines aligned with a movement path of a mobile body equipped with the power receiving device; and a plurality of power supply devices connected to the plurality of feeder lines and configured to supply an alternating current to the plurality of feeder lines, each power supply device of the plurality of power supply devices comprises:
- a corresponding feeder line of the plurality of feeder lines;
- a power supply circuit configured to output the alternating current to the corresponding feeder line of the plurality of feeder lines;
- a power supply controller configured to control the power supply circuit; and
- an adjustment unit configured to adjust a circuit characteristic, which is at least either an inductance or a capacitance of a feeder circuit including the corresponding feeder line of the plurality of feeder lines connected to a corresponding power supply device, the non-contact power supply facility further comprising an adjustment system configured to adjust the adjustment unit of each of the plurality of power supply devices, wherein:
- a target power supply device is a first power supply device of the plurality of power supply devices that is an adjustment target, a target feeder line is a first feeder line of the plurality of feeder lines connected to the target power supply device, an adjacent feeder line is a second feeder line of the plurality of feeder lines adjacent to the target feeder line, an adjacent power supply device is a second power supply device of the plurality of power supply devices connected to the adjacent feeder line, and a regular power supply operation is an operation of the plurality of power supply devices to supply electric power to the mobile body,
- the adjustment system causes the target power supply device to execute a first processing and a second processing while causing the adjacent power supply device to perform the regular power supply operation,
- the first processing is processing for measuring a first voltage value, which is a value of a first voltage on the target feeder line, while the power supply circuit of the target power supply device does not output the alternating current,
- the second processing is processing for measuring a second voltage value, which is a value of a second voltage on the target feeder line, while the power supply circuit of the target power supply device outputs the alternating current, and
- the adjustment system executes, after executing the first processing and the second processing, an adjustment processing for obtaining a feeder circuit reactance, which is a reactance of the feeder circuit of the target power supply device, based on a difference between the first voltage value and the second voltage value, and adjusting the circuit characteristic with use of the adjustment unit in accordance with the feeder circuit reactance obtained, such that a feeder circuit impedance, which is an impedance of the feeder circuit of the target power supply device, is a predetermined impedance.

2. The non-contact power supply facility according to claim 1,
wherein the power supply controller controls an output voltage of the power supply circuit such that a current of a predetermined value flows through the corresponding feeder line connected to the corresponding power supply device, and wherein the adjustment system, after executing the adjustment processing, acquires a supply power, which is an electric power supplied to each feeder line of the plurality of feeder lines based on a voltage on each feeder line of the plurality of feeder lines and a current flowing through each feeder line of the plurality of feeder lines, executes a check processing for determining whether or not the output voltage of the power supply circuit is within an appropriate range relative to the supply power, and, in response to determining through the check processing that the output voltage is not within the appropriate range, re-executes the first processing, the second processing, and the adjustment processing.

3. The non-contact power supply facility according to claim 2,
wherein the adjustment system executes the check processing for the corresponding feeder line and the corresponding power supply device after completing the first processing, the second processing, and the adjustment processing for each power supply device of the plurality of power supply devices.

4. The non-contact power supply facility according to claim 2,
wherein in response to, in the check processing, the output voltage not falling within the appropriate range even after the adjustment processing has been performed a predetermined number of times, the adjustment system lengthens at least either a first sampling period, which is a period of measuring the first voltage value through the first processing, or a second sampling period, which is a period of measuring the second voltage value through the second processing.

5. The non-contact power supply facility according to claim 1,
wherein each power supply device of the plurality of power supply devices comprises an adjustment command receiver configured to receive an adjustment command to adjust the feeder circuit impedance in the corresponding power supply device, and wherein in response to the adjustment command receiver receiving the adjustment command, the adjustment system executes the first processing, the second processing, and the adjustment processing for the corresponding power supply device, wherein the corresponding power supply device is the target power supply device that received the adjustment command.

6. An impedance adjustment method for a non-contact power supply facility for adjusting a feeder circuit impedance, which is an impedance of a feeder circuit including a feeder line and a power supply device, in a non-contact power supply facility configured to supply electric power to a power receiving device in a non-contact manner, the facility comprising:
- a plurality of feeder lines aligned with a movement path of a mobile body equipped with the power receiving device; and
- a plurality of power supply devices connected to the plurality of feeder lines and configured to supply an alternating current to the plurality of feeder lines, wherein each power supply device of the plurality of power supply devices comprises:
a corresponding feeder line of the plurality of feeder lines;
a power supply circuit configured to output the alternating current to the corresponding feeder line of the plurality of feeder lines;
a power supply controller configured to control the power supply circuit; and
an adjustment unit configured to adjust a circuit characteristic, which is at least either an inductance or a capacitance of the feeder circuit,
wherein a target power supply device is a first power supply device of the plurality of power supply devices that is an adjustment target, a target feeder line is a first feeder line of the plurality of feeder lines connected to the target power supply device, an adjacent feeder line is a second feeder line of the plurality of feeder lines adjacent to the target feeder line, an adjacent power supply device is a second power supply device of the plurality of power supply devices connected to the adjacent feeder line, and a regular power supply operation is an operation of the plurality of power supply devices to supply electric power to the mobile body,
the method comprising:
a first processing for measuring a first voltage value, which is value of a first voltage on the target feeder line, while the adjacent power supply device is caused to perform the regular power supply operation and the power supply circuit of the target power supply device does not output the alternating current;
a second processing for measuring a second voltage value, which is a value of a second voltage on the target feeder line, while at least one the adjacent power supply device is caused to perform the regular power supply operation and the power supply circuit of the target power supply device outputs the alternating current; and
an adjustment processing for obtaining, after executing the first processing and the second processing, a feeder circuit reactance, which is a reactance of the feeder circuit of the target power supply device, based on a difference between the first voltage value and the second voltage value, and adjusting the circuit characteristic with use of the adjustment unit in accordance with the feeder circuit reactance obtained, such that the feeder circuit impedance of the feeder circuit of the target power supply device is a predetermined impedance.

7. An impedance adjustment program product comprising at least one non-transitory computer-readable medium including instructions for, in a non-contact power supply facility, causing a computer to perform functions of adjusting a feeder circuit impedance, which is an impedance of a feeder circuit including a feeder line and a power supply device, in a non-contact power supply facility configured to supply electric power to a power receiving device in a non-contact manner, the facility including:

a plurality of feeder lines aligned with a movement path of a mobile body equipped with the power receiving device; and
a plurality of power supply devices connected to the plurality of feeder lines and configured to supply an alternating current to the plurality of feeder lines,
each power supply device of the plurality of power supply devices including:
a corresponding feeder line of the plurality of feeder lines;
a power supply circuit configured to output the alternating current to the corresponding feeder line of the plurality of feeder lines;
a power supply controller configured to control the power supply circuit; and
an adjustment unit configured to adjust a circuit characteristic, which is at least either an inductance or a capacitance of the feeder circuit including Uall the corresponding feeder line of the plurality of feeder lines connected to a power supply device,
wherein a target power supply device is a first power supply device of the plurality of power supply devices to be an adjustment target, a target feeder line is a first feeder line of the plurality of feeder lines connected to the target power supply device, an adjacent feeder line is a second feeder line of the plurality of feeder lines adjacent to the target feeder line, an adjacent power supply device is a second power supply device of the plurality of power supply devices connected to the adjacent feeder line, and a regular power supply operation is an operation of the plurality of power supply devices to supply electric power to the mobile body,
the instructions causing the computer to perform:
a first function of measuring a first voltage value, which is value of a first voltage on the target feeder line, while the adjacent power supply device is caused to perform the regular power supply operation and the power supply circuit of the target power supply device does not output the alternating current;
a second function of measuring a second voltage value, which is a value of a second voltage on the target feeder line, while the adjacent power supply device is caused to perform the regular power supply operation and the power supply circuit of the target power supply device outputs the alternating current; and
an adjustment function of obtaining, after realizing the first function and the second function, a feeder circuit reactance, which is a reactance of the feeder circuit of the target power supply device, based on a difference between the first voltage value and the second voltage value, and adjusting the circuit characteristic with use of the adjustment unit in accordance with the feeder circuit reactance obtained, such that the feeder circuit impedance of the feeder circuit of the target power supply device is a predetermined impedance.

* * * * *

UNITED STATES PATENT AND TRADEMARK OFFICE
CERTIFICATE OF CORRECTION

| | | |
|---|---|---|
| PATENT NO. | : 12,032,400 B2 | Page 1 of 1 |
| APPLICATION NO. | : 17/980935 | |
| DATED | : July 9, 2024 | |
| INVENTOR(S) | : Makoto Nunoya et al. | |

It is certified that error appears in the above-identified patent and that said Letters Patent is hereby corrected as shown below:

In the Claims

Column 23, Line 34, Claim 6, after "while" delete "at least one"

Column 24, Line 18, Claim 7, after "including" delete "Uall"

Signed and Sealed this
Tenth Day of September, 2024

Katherine Kelly Vidal
*Director of the United States Patent and Trademark Office*